Patented Jan. 7, 1947

2,413,983

UNITED STATES PATENT OFFICE 2,413,983

METHOD OF FORMING KERATIN SOLUTIONS

Bernard Lustig and Albert A. Kondritzer, Stamford, Conn., assignors to Lawrence Richard Bruce, Incorporated, Stamford, Conn., a corporation of Connecticut No Drawing. Application April 6, 1944, Serial No. 529,857

6 Claims. (Cl. 260—112)

This invention relates to improvements in methods for obtaining keratin, being particularly directed to the production of solutions of keratin suitable for forming fibres, films, coatings and compounds with organic and inorganic substances.

Up to the present time it has been known that keratin may be dissolved by strong alkalis alone, for example, sodium hydroxide, or alkaline solutions of thioglycollates or sulphides.

Of these two groups of reagents, the alkalis per se have the effect of irreversibly damaging the keratin to the extent of destruction of the amino acids, such as arginine, and especially the cystine thereof through the loss of sulphur, etc. As to the thioglycollates and sulphides above, reaction at pH of 11 and higher, which is the range recommended for hair, results in a damage similar to that of strong alkalis. If these reagents are used at a pH of from 10 to 11 they will dissolve comparatively little keratin, particularly in relation to hair, wool and feathers, however irrespective of the pH range, the end product, namely, the kerato-protein thus dissolved will be insoluble once the above solubilizing reagent is removed.

For example, if hair is treated with thioglycollic acid at a pH of 11 for 24 hours, and the solution is dialyzed, all of the keratin precipitates out. The precipitate is insoluble in water, acids and weak alkali. Even if it were proposed to dialyze the solutions of keratin formed in accordance with the above illustration against an alkaline buffer of pH 8.5, precipitation still persists.

Broadly, it is an object of this invention to provide a method for the production of soluble keratins which remain in solution in water, weak alkali and weak acids at a pH above 5.

We have found that if inorganic or organic acid groups are introduced into the keratin molecule, such keratin, if later brought in solution by the use of thioglycollic acid or sulphides at a pH of about 10, the keratin solution thus obtained is stable even after the removal of the solubilizing reagent.

The keratin obtained shows a high molecular weight above 25,000, is essentially uniform in the electro-phoretic field, remains in solution upon addition of weak alkalis or acids above pH 5, and will remain in solution after re-oxidation of the protein-SH groups opened by the solubilizing reagent.

We have found by virtue of our pre-treatment with acid prior to the solubilizing step involving the application of alkalis that the acid combines with keratin to form an acid derivative not hydrolyzed or removed from the kerato-protein in the solubilizing step and stable to dialysis.

We have found that the acid thus applied forms a stable acid group with the hydroxyl group of serine and tyrosine and may also combine with the amide group of arginine, and other amine acids in the keratin. These acid groups remain substantially in combined form with the keratin and it is this combination which is considered to contribute to the high solubility of the keratin in the solubilizing agent, and the maintenance of such high solubility of the keratin during dialysis and at the relatively low pH.

A further advantage of our process lies in the following: If in the example of the prior art keratin is treated with an alkaline thioglycollate solution and an acid added until a precipitate is formed, such precipitate, particularly after being dried, may only be brought back into solution by the use of an alkali at pH 10 or higher or an alkaline thioglycollic acid solution. However, by such treatment a further damage to the already degraded kerato-protein will take place.

On the other hand, if the keratin solution formed under our method is precipitated and dried to powder, as by use of acids at the pH of 5 or lower, such precipitate may be easily re-dissolved without degradation or damage by the use of very weak alkalis in the range of pH 8 to 9. Such solution may, without precipitation, be neutralized to pH 7.

The advantages of this method over the prior art reside in the two functions of the pre-treatment, namely, the increased solubility of the keratin in solubilizing agents at pH below 11, which decreases the amount of permanent degradation of the keratin and the increased solubility of the end product, the solubilized keratin, in reagents of pH of between 5 to 8.

Some preferred embodiments of our invention involving the application of different types of treatment reagents, as for example inorganic or organic acids, are outlined as follows:

Example I

We treat hair at 0° C. with a concentrated sulphuric acid for a period of approximately 24 hours, the surplus of the acid is removed and the rest of the acid diluted by the use of ice water. The hair is then washed until no free sulphuric acid can be found. Such product can be dissolved by thioglycollic acid at a pH of 9 or higher, the protein remaining in solution after the removal of dialysis of the alkali and the thioglycollic acid. For example, the protein can be precipitated by adding acetic acid at a pH below 5, the precipitate being washed in weak acetic acid and dried for the removal of the alkali and thioglycollic acid.

It is to be pointed out that the removal of the solubilizing reagent such as thioglycollic acid, sulphides, and alkalis by dialysis, does not precipitate the protein.

*Example II*

Wool is treated with concentrated formic acid for five days at 40° C., after which period the acid is removed by diluting and washing with water until no free formic acid is found. Such wool, if dissolved in thioglycollic acid, in alkali, at a pH of 9 or higher, remains in solution after dialysis and can be precipitated with acids at a pH under 5.

Although in Example I we have illustrated the use of sulphuric acid as the inorganic pre-treating agent, we have found that other inorganic acids, for example, phosphoric acid or chlor-sulphonic acid, have the same effect. Similarly, with respect to the use of organic acids illustrated in Example II, we have found that other organic acids, for example acetic acid and chlor-acetic acid, lactic acid, etc. have the same effect.

We have found that with each type of keratoprotein the amount and concentration of the pre-treating acid applied and the temperature and time of such application are to be varied, dependent upon the nature of the end product soluble keratin protein desired and the acid used.

We have found that the soluble keratins produced in accordance with our method can be applied to the production of fibres, film formations, coatings, alone or combined with other organic or inorganic substances. It can be precipitated chemically or made insoluble by the use of polyvalent metal salts, acids below a pH of 5, or any other known protein precipitating or denaturing agent and it can be precipitated or made insoluble by physical phenomena through the application of steam, high temperatures or highly concentrated salt solutions.

Various changes and modifications may be made to the details of the invention without departing from the broader spirit and scope thereof, as set forth in the following claims.

We claim:

1. The method for forming soluble keratoprotein from keratin fibre or the like, consisting of treating the keratin fibre with a concentrated acid at temperatures between 0° and 40° C. to introduce acid groups into the protein molecule without dissolving the same, and thereafter dissolving the thus pretreated fibre with solubilizing reagents of a group consisting of reducing agents having the property of opening cystine bonds of the keratin.

2. The method for forming soluble keratoprotein from keratin fibre or the like, consisting of treating the keratin fibre with a concentrated acid at temperatures between 0° and 40° C. to introduce acid groups into the protein molecule without dissolving the same, and thereafter dissolving the thus pretreated fibre with solubilizing reagents of a group consisting of reducing agents having the property of opening cystine bonds of the keratin, said pretreatment being of such nature that the acid group introduced into protein molecule remains chemically combined with the keratin upon removal of the solubilizing reagent.

3. The method for forming soluble keratoprotein from keratin fibre or the like, consisting of treating the keratin fibre with a concentrated acid at temperatures between 0° and 40° C. to introduce acid groups into the protein molecule without dissolving the same, thereafter dissolving the thus pretreated fibre with solubilizing reagents of a group consisting of reducing agents having the property of opening cystine bonds of the keratin and finally separating the solubilizing reagent from the keratin solution.

4. The method for forming soluble keratoprotein from keratin fibre or the like, consisting of treating the keratin fibre with a concentrated acid at temperatures between 0° and 40° C. to introduce acid groups into the protein molecule without dissolving the same, and thereafter dissolving the thus pretreated fibre with solubilizing reagents of a group consisting of reducing agents having the property of opening cystine bonds of the keratin and finally separating the solubilizing reagent from the keratin solution by dialysis.

5. The method of forming soluble keratoprotein from keratin fibres or the like, consisting of treating the keratin fibre with a concentrated acid at temperatures between 0° and 40° C. to introduce acid groups into the protein molecule without dissolving the same, and thereafter dissolving the thus pretreated fibre with solubilizing reagents of a group consisting of reducing agents having the property of opening cystine bonds of the keratin and finally separating the solubilizing reagent from the keratin solution, said pretreatment being of such nature that the acid group introduced into the protein molecule remains chemically combined after removal of the solubilizing reagent.

6. The method for forming soluble keratoprotein or keratin fibre or the like, consisting of treating the keratin fibre with a concentrated acid at temperatures between 0° to 40° C. to introduce acid groups into the protein molecule without dissolving the same, removing the free acid and thereafter dissolving the thus pretreated keratin fibre with solubilizing reagents consisting of reducing agents at a pH range from 6 to 11, and having the property of opening the cystine bonds of the keratin and finally separating the solubilizing reagent from the keratin solution, said acid treatment being of such nature that the acid group introduced in the protein molecule remains chemically combined therewith after removal of the solubilizing agent from the keratin solution.

BERNARD LUSTIG.
ALBERT A. KONDRITZER.